United States Patent
Suzuki et al.

(10) Patent No.: US 12,429,004 B2
(45) Date of Patent: Sep. 30, 2025

(54) FUEL SUPPLY DEVICE FOR INTERNAL COMBUSTION ENGINE

(71) Applicant: TOYOTA JIDOSHA KABUSHIKI KAISHA, Toyota (JP)

(72) Inventors: Yuki Suzuki, Kariya (JP); Mina Tachibana, Toyota (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/928,213

(22) Filed: Oct. 28, 2024

(65) Prior Publication Data

US 2025/0198355 A1    Jun. 19, 2025

(30) Foreign Application Priority Data

Dec. 14, 2023  (JP) ................................ 2023-211283

(51) Int. Cl.
*F02D 19/02*  (2006.01)
*F02D 41/40*  (2006.01)

(52) U.S. Cl.
CPC .......... *F02D 19/024* (2013.01); *F02D 41/401* (2013.01)

(58) Field of Classification Search
CPC .... F02D 19/024; F02D 41/401; F02D 19/022; F02D 41/0027; F02D 41/123; F02D 41/126; F02D 19/027; F02D 2200/0602; Y02T 10/30
See application file for complete search history.

(56) References Cited

U.S. PATENT DOCUMENTS

| | | | | |
|---|---|---|---|---|
| 2010/0010726 A1* | 1/2010 | Orikabe | .............. | F02D 19/0605 701/103 |
| 2014/0311444 A1* | 10/2014 | Coldren | .............. | F02D 41/0027 123/304 |
| 2015/0007540 A1* | 1/2015 | Sarai | .................. | B01D 46/0087 55/505 |
| 2015/0337769 A1* | 11/2015 | Yoshioka | ........... | F02M 21/0206 137/512 |
| 2016/0281873 A1* | 9/2016 | Yoshioka | ........... | G05D 16/0402 |

FOREIGN PATENT DOCUMENTS

| | | | |
|---|---|---|---|
| ES | 2317482 T3 * | 4/2009 | .......... F02D 19/022 |
| JP | 2022182969 A | 12/2022 | |

\* cited by examiner

*Primary Examiner* — Hung Q Nguyen

(57) ABSTRACT

A fuel supply device for an internal combustion engine includes a tank that stores gas fuel, a fuel injection valve that supplies gas fuel to a cylinder, a fuel pipe that supplies gas fuel in the tank to the fuel injection valve, a pressure reducing valve provided downstream of the tank in the fuel pipe, a second shut-off valve as an electromagnetic valve that is provided downstream of the pressure reducing valve in the fuel pipe so as to open and close the fuel pipe, and a controller. A pressure reduced by the pressure reducing valve is defined as an outlet-side pressure. The pressure reducing valve includes a valve member that opens and closes in accordance with an increase and a decrease in the outlet-side pressure. The controller executes a valve closing process of closing the second shut-off valve when a stop condition for stopping fuel injection of the fuel injection valve is met.

4 Claims, 3 Drawing Sheets

FUEL SUPPLY DEVICE FOR INTERNAL COMBUSTION ENGINE

CROSS-REFERENCE TO RELATED APPLICATIONS

This application is based upon and claims the benefit of priority from prior Japanese Patent Application No. 2023-211283, filed on Dec. 14, 2023, the entire contents of which are incorporated herein by reference.

BACKGROUND

1. Field

The present disclosure relates to a fuel supply device for an internal combustion engine.

2. Description of Related Art

For example, in an internal combustion engine disclosed in Japanese Laid-Open Patent Publication No. 2022-182969, high-pressure gas fuel stored in a tank is reduced in pressure and supplied to a fuel injection valve.

When reducing the pressure of high-pressure gas fuel, a pressure reducing valve is used. In the case of a mechanical pressure reducing valve with a valve member that opens and closes in response to changes in an outlet-side pressure (i.e., the pressure after being reduced by the pressure reducing valve), the following issues may arise.

Specifically, due to a delayed response of the valve member when the fuel injection from the fuel injection valve is stopped, a temporary overshoot in fuel pressure may occur in a section of the fuel passage downstream of the pressure reducing valve. If this fuel pressure overshoot is transmitted to the fuel injection valve, the internal pressure of the fuel injection valve may become excessively high.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a fuel supply device for an internal combustion engine includes a tank that stores gas fuel, a fuel injection valve that supplies gas fuel to a cylinder, a fuel passage that supplies the gas fuel in the tank to the fuel injection valve, a pressure reducing valve that is provided downstream of the tank in the fuel passage, an electromagnetic valve that is provided downstream of the pressure reducing valve in the fuel passage so as to open and close the fuel passage, and a processing circuitry. A pressure reduced by the pressure reducing valve is defined as an outlet-side pressure. The pressure reducing valve includes a valve member that opens and closes in accordance with an increase and a decrease in the outlet-side pressure. The processing circuitry is configured to execute a valve closing process of closing the electromagnetic valve when a stop condition for stopping fuel injection of the fuel injection valve is met.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of a fuel supply device for an internal combustion engine will be described with reference to FIGS. 1 to 3.

Fuel Supply Device for Internal Combustion Engine

Figure 1:
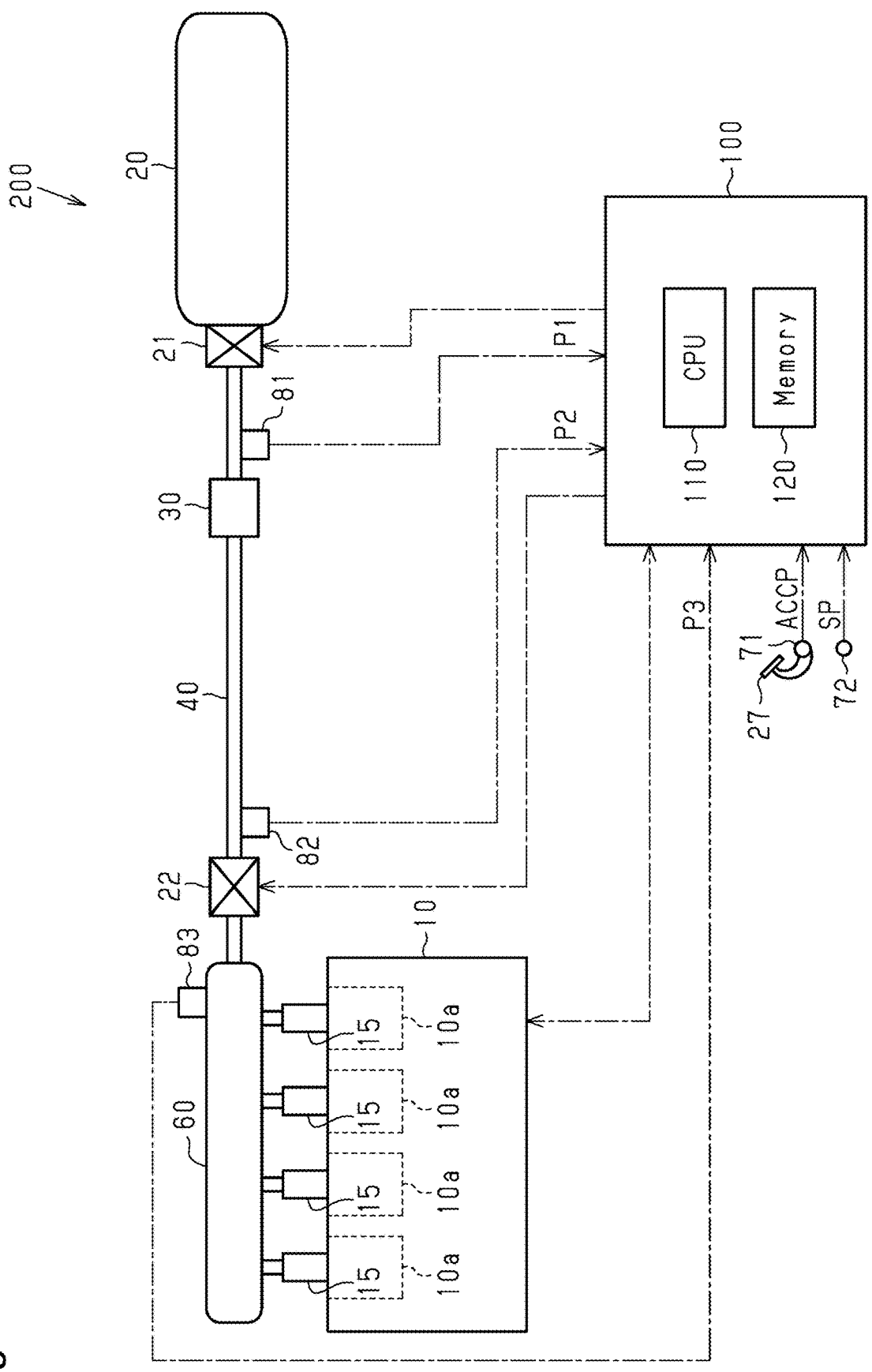
FIG. 1 is a schematic diagram showing a fuel supply device for an internal combustion engine according to an embodiment.

An internal combustion engine 10 shown in FIG. 1 uses hydrogen gas, which is a gas fuel, as fuel.

A fuel supply device 200 included in the internal combustion engine 10 includes fuel injection valves 15, a tank 20, a fuel pipe 40, a first shut-off valve 21, a second shut-off valve 22, a pressure reducing valve 30, and a delivery pipe 60.

The fuel injection valves 15 supply fuel to cylinders 10a of the internal combustion engine 10.

The tank 20 stores hydrogen gas, which is a gas fuel, in a compressed state.

The fuel pipe 40 is a fuel passage through which fuel flows, and connects the tank 20 and the delivery pipe 60.

The fuel injection valves 15 are connected to the delivery pipe 60.

The hydrogen gas stored in the tank 20 is supplied to the fuel injection valves 15 via the fuel pipe 40 and the delivery pipe 60.

The first shut-off valve 21, the pressure reducing valve 30, and the second shut-off valve 22 are arranged in the fuel pipe 40 in this order in a direction of fuel flow.

The first shut-off valve 21 is an electromagnetic valve arranged near an outlet of the tank 20. When the first shut-off valve 21 is open, fuel is supplied from the tank 20 to the fuel pipe 40. When the first shut-off valve 21 is closed, the supply of fuel from the tank 20 to the fuel pipe 40 is stopped.

The pressure reducing valve 30 is a mechanical pressure reducing valve that adjusts the fuel pressure, which is the pressure of the hydrogen gas supplied to the fuel injection valves 15, to a pressure corresponding to the engine operating state.

The second shut-off valve 22 is an electromagnetic valve, and is disposed in the vicinity of the delivery pipe 60. When the second shut-off valve 22 is open, fuel is supplied to the delivery pipe 60. When the second shut-off valve 22 is closed, the supply of fuel to the delivery pipe 60 is stopped.

The first shut-off valve 21 and the second shut-off valve 22 are closed while the operation of the internal combustion engine 10 is stopped. On the other hand, the first shut-off valve 21 and the second shut-off valve 22 are basically open during operation of the internal combustion engine 10.

The first pressure sensor 81 is provided in the fuel pipe 40 between the first shut-off valve 21 and the pressure reducing valve 30. The first pressure sensor 81 detects a first pressure P1, which is the fuel pressure in the fuel pipe 40 between the first shut-off valve 21 and the pressure reducing valve 30.

The second pressure sensor 82 is provided in the fuel pipe 40 between the pressure reducing valve 30 and the second shut-off valve 22. The second pressure sensor 82 detects a second pressure P2, which is the fuel pressure sensor in the fuel pipe 40 between the pressure reducing valve 30 and the second shut-off valve 22.

The third pressure sensor 83 provided in the delivery pipe 60 detects a third pressure P3, which is a fuel pressure in the delivery pipe 60.

The controller 100 performs various types of control such as fuel injection of the internal combustion engine 10 by controlling various control targets such as the fuel injection valves 15, the first shut-off valve 21, and the second shut-off valve 22. Such a controller 100 includes a central processing unit (CPU) 110 and a memory 120 formed by a read-only memory (ROM), a random-access memory (RAM), or the like. The CPU 110 executes a program stored in the memory 120 to perform the various types of controls.

The controller 100 refers to various values used to control the internal combustion engine 10. For example, the controller 100 refers to the detection values of the first pressure sensor 81, the second pressure sensor 82, and the third pressure sensor 83. Further, the controller 100 refers to a detection signal of an accelerator position sensor 71 that detects an accelerator operation amount ACCP that is an operation amount of an accelerator pedal 27 operated by a driver of the vehicle on which the internal combustion engine 10 is mounted. In addition, the controller 100 refers to a detection signal of a speed sensor 72 that detects a vehicle speed SP of a vehicle on which the internal combustion engine 10 is mounted. In addition, the controller 100 refers to a detection signal for calculating an engine rotation speed of the internal combustion engine 10, a detection signal of an intake air amount, or the like.

When a stop condition for stopping the fuel injection of the fuel injection valves 15 is met during the operation of the internal combustion engine 10, the controller 100 executes a fuel cut for stopping the fuel injection of the fuel injection valves 15. A specific example of the stop condition is that the accelerator pedal 27 is turned off during the operation of the internal combustion engine 10 and the accelerator operation amount ACCP becomes 0. That is, the stop condition is that the output required for the internal combustion engine 10 becomes 0 during the operation of the internal combustion engine 10. The fuel injection stop of the fuel injection valves 15 due to the stop condition being met does not include the fuel injection stop of the fuel injection valves 15 performed when the engine operation is stopped by the OFF operation of the ignition switch or the like.

Structure of Pressure Reducing Valve

Since the pressure reducing valve 30 is a well-known mechanical pressure reducing valve, a detailed description thereof will be omitted, but an outline thereof is as follows.

Figure 2:
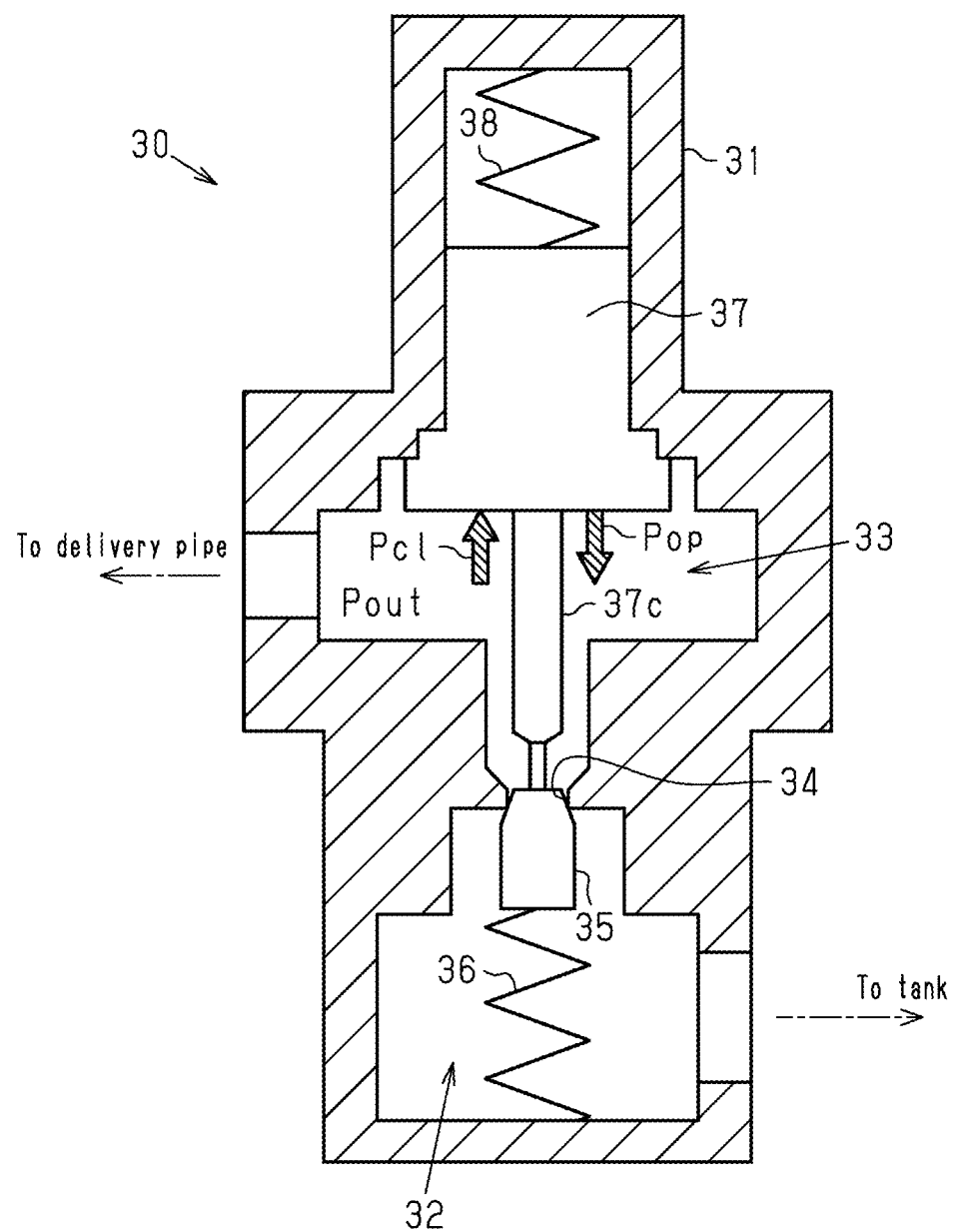
FIG. 2 is a cross-sectional view of a pressure reducing valve provided in the fuel supply device according to the embodiment.

As shown in FIG. 2, in a housing 31 of the pressure reducing valve 30, a first fuel chamber 32 into which the fuel before pressure reduction flows, a second fuel chamber 33 from which the fuel after pressure reduction flows out, and a communication hole 34 communicating the first fuel chamber 32 and the second fuel chamber 33 are formed.

The first fuel chamber 32 is connected to a fuel pipe 40 that is connected to the first shut-off valve 21. That is, the first fuel chamber 32 is connected to the tank 20 side. A valve member 35 for opening and closing the communication hole 34 and a spring 36 for urging the valve member 35 in a direction to close the communication hole 34 are disposed in the first fuel chamber 32.

The second fuel chamber 33 is connected to the fuel pipe 40 connected to the second shut-off valve 22, that is, the second fuel chamber 33 is connected to the delivery pipe 60 side.

When the pressure after being reduced by the pressure reducing valve 30 is referred to as an outlet-side pressure Pout, the second fuel chamber 33 is provided with a cylinder 37 that is displaced in accordance with an increase or decrease in the outlet-side pressure Pout, and a spring 38 that biases the cylinder 37 toward the valve member 35. A needle 37c in contact with the valve member 35 is fixed to the cylinder 37.

Opening and Closing Actions of Pressure Reducing Valve

When the second pressure P2 is decreased by the fuel injection from the fuel injection valves 15, the outlet-side pressure Pout is decreased. When the outlet-side pressure Pout decreases, the fuel pressure of the second fuel chamber 33 decreases, so that the force Pcl for displacing the cylinder 37 in the direction away from the valve member 35 decreases. When the force Pcl decreases, the force against the force Pop of the spring 38 that biases the cylinder 37 toward the valve member 35 decreases, and thus the cylinder 37 is displaced in a direction approaching the valve member 35. When the cylinder 37 is displaced in a direction approaching the valve member 35, the needle 37c pushes down the valve member 35 in a direction away from the communication hole 34. Then, the valve member 35 which has been pushed down is separated from the valve seat of the communication hole 34, whereby the valve member 35 is opened.

When the valve member 35 is opened, the fuel flows into the second fuel chamber 33 via the communication hole 34 from the first fuel chamber 32 into which the high-pressure fuel before pressure reduction flows. When the outlet-side pressure Pout increases due to the inflow of the fuel into the second fuel chamber 33, the force Pcl increases, so that force against the force Pop of the spring 38 urging the cylinder 37 toward the valve member 35 increases. Therefore, the cylinder 37 is displaced in a direction away from the valve member 35. When the cylinder 37 is displaced in a direction away from the valve member 35, the valve member 35 that has been pushed down by the needle 37c is pushed up in a direction toward the communication hole 34 by the biasing force of the spring 36. Then, the valve member 35 is closed when the lifted valve member 35 abuts against the valve seat of the communication hole 34.

In this way, the pressure reducing valve 30 is a valve having the valve member 35 which opens and closes in accordance with the increase and decrease of the outlet-side pressure Pout.

Overshoot of Fuel Pressure

When the fuel injection amount of the fuel injection valves 15 is large, the degree of decrease in the outlet-side pressure Pout is larger than when the fuel injection amount is small. When the degree of decrease in the outlet-side pressure Pout increases, the amount of movement of the valve member 35 in the valve opening direction increases, so the amount of fuel passing through the communication hole 34, that is, the amount of fuel passing through the pressure reducing valve 30, increases. In a state where the amount of fuel passing through the pressure reducing valve 30 is large, for example, when the fuel injection of the fuel injection valves 15 is stopped due to a fuel cut or the like, the valve member 35 moves in the valve closing direction because the decrease in the outlet-side pressure Pout subsides. However, since the movement amount of the valve member 35 in the valve opening direction is large, a response delay time from the stop of the fuel injection of the fuel injection valves 15 to the closing of the valve member 35 becomes long. Within this response delay time, the fuel flows from the first fuel chamber 32 toward the second fuel chamber 33, so if the response delay time becomes longer, the amount of fuel flowing into the second fuel chamber 33 becomes larger. When the amount of fuel flowing into the second fuel chamber 33 becomes excessively large, the outlet-side pressure Pout is likely to overshoot. When the outlet-side pressure Pout overshoots, the overshoot of the fuel pressure is transmitted to the fuel injection valves 15, which may excessively increase the fuel pressure in the fuel injection valves 15. If the fuel pressure in the fuel injection valves 15 becomes excessively high, it may become difficult to open the fuel injection valves 15 when resuming the fuel injection, or the accuracy of the fuel injection amount may decrease.

Processes Executed by Controller

Figure 3:
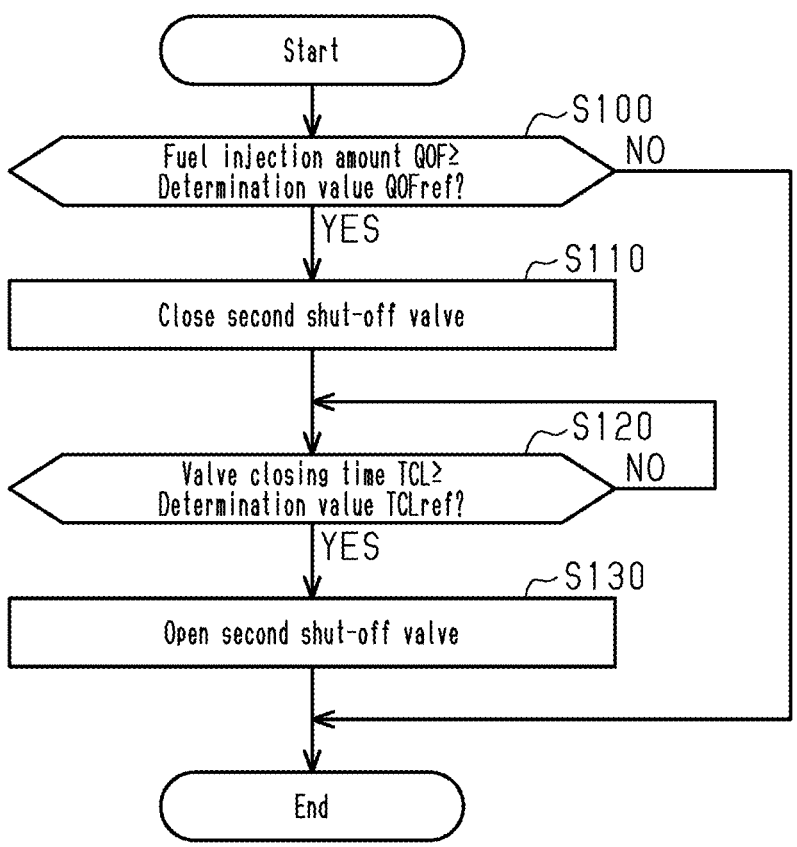
FIG. 3 is a flowchart showing a procedure of a processes executed by a controller according to the embodiment.

The controller 100 suppresses the occurrence of the above-described inconvenience by executing the processing shown in FIG. 3.

FIG. 3 shows a procedure of processing executed by the controller 100. The process shown in FIG. 3 is performed by the CPU110 executing a program stored in the memory 120 of the controller 100. The execution of the process shown in FIG. 3 is started when the stop condition for stopping the fuel injection of the fuel injection valves 15 during the operation of the internal combustion engine 10 is met. In the following description, the number of each step is represented by the letter S followed by a numeral.

When this process is started, the controller 100 determines whether or not the fuel injection amount QOF is greater than or equal to a determination value QOFref (S100). The fuel injection amount QOF is a fuel injection amount instructed from the controller 100 to the fuel injection valves 15 at the time when the stop condition for stopping the fuel injection of the fuel injection valves 15 is met. The determination value QOFref is a minimum fuel injection amount at which the above-described overshoot occurs, and is set in advance.

In the process of S100, when it is determined that the fuel injection amount QOF is greater than or equal to the determination value QOFref (S100: YES), the controller 100 executes a valve closing process of closing the second shut-off valve 22 by outputting a valve-closing command to the second shut-off valve 22 (S110).

Next, the controller 100 determines whether or not the valve closing time TCL is greater than or equal to the determination value TCLref (S120). The valve closing time TCL is an elapsed time from when a valve-closing command is output to the second shut-off valve 22 in S110, and is measured by the controller 100. In addition, the determination value TCLref is a time required from when the valve-closing command is output to the second shut-off valve 22 to when the overshoot described above subsides, and is set in advance.

Then, the controller 100 repeats the process of S120 until it is determined that the valve closing time TCL is greater than or equal to the determination value TCLref.

In the process of S120, when it is determined that the valve closing time TCL is greater than or equal to the determination value TCLref (S120: YES), the controller 100 executes a valve opening process of opening the second shut-off valve 22 by outputting a valve-opening command to the second shut-off valve 22 (S130).

When ending the process of S130 or when making a negative determination in the process of S100, the controller 100 ends the present process.

Operation and Advantages of Present Embodiment (1) When the stop condition for stopping the fuel injection of the fuel injection valves 15 is met, the controller 100 executes the valve closing process of closing the second shut-off valve 22, which is the electromagnetic valve provided in a section of the fuel pipe 40 downstream of the pressure reducing valve 30. Therefore, the overshoot of the fuel pressure generated in the section of the fuel pipe 40 downstream of the pressure reducing valve 30 when the fuel injection of the fuel injection valves 15 is stopped is not transmitted to the section of the fuel pipe 40 downstream of the second shut-off valve 22. Therefore, it is possible to prevent the fuel pressure in the fuel injection valves 15 from becoming excessively high when the fuel injection of the fuel injection valves 15 is stopped.

(2) There is a time difference between when the stop condition for stopping the fuel injection of the fuel injection valves 15 is met and when the fuel injection of the fuel injection valves 15 is actually stopped. In this regard, in the present embodiment, when the stop condition for stopping the fuel injection of the fuel injection valves 15 is met, the process shown in FIG. 3 is started to close the second shut-off valve 22. Therefore, the second shut-off valve 22 is closed before the overshoot of the fuel pressure generated upstream of the second shut-off valve 22 reaches the second shut-off valve 22.

(3) If the injection amount of the fuel injection valves 15 at the time of stopping the fuel injection is relatively large, a temporary overshoot of the fuel pressure is likely to occur in the section of the fuel pipe 40 downstream of the pressure reducing valve 30 when the fuel injection of the fuel injection valves 15 is stopped.

In this regard, in the present embodiment, the execution of the process shown in FIG. 3 is started when the stop condition for stopping the fuel injection of the fuel injection valves 15 is met. Then, in the process of S100 shown in FIG. 3, the controller 100 executes the valve closing process when determining that the fuel injection amount QOF of the fuel injection valves 15 is greater than or equal to the prescribed determination value QOFref. That is, the controller 100 executes the valve closing process of the second shut-off valve 22 when the stop condition for stopping the fuel injection of the fuel injection valves 15 is met and the injection amount of the fuel injection valves 15 at the time when the stop condition is met is greater than or equal to the determination value QOFref. Therefore, the valve closing process of the second shut-off valve 22 is executed when the above-described overshoot of the fuel pressure is likely to occur.

(4) The above-described overshoot of the fuel pressure subsides when a certain amount of time elapses. In this regard, the controller 100 of the present embodiment executes the valve opening process of opening the second shut-off valve 22 when the valve closing time TCL of the second shut-off valve 22 due to the execution of the valve closing process of the second shut-off valve 22 becomes greater than or equal to the prescribed determination value TCLref. Therefore, since the second shut-off valve 22 can be opened after the overshoot of the fuel pressure subsides, the second shut-off valve 22 can be opened at an appropriate timing.

Modifications

The above-described embodiments may be modified as follows. The above-described embodiments and the following modifications can be combined as long as the combined modifications remain technically consistent with each other.

In the above embodiment, when the valve closing time TCL of the second shut-off valve 22 becomes greater than or equal to the determination value TCLref, the valve opening process of opening the second shut-off valve 22 is executed. In addition, after the valve closing process of the second shut-off valve 22 is executed, the valve opening process of opening the second shut-off valve 22 may be executed when the overshoot of the fuel pressure detected by the second pressure sensor 82 has subsided.

Figure 4:
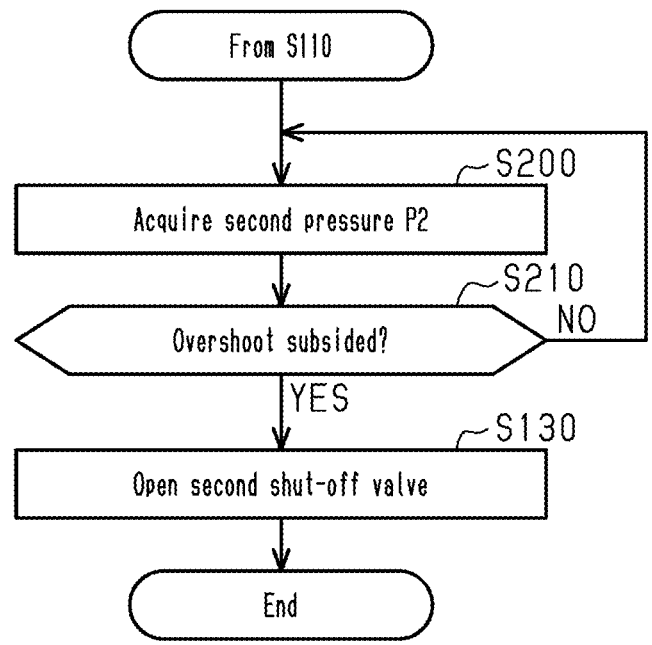
FIG. 4 is a flowchart showing a procedure of processes executed by a controller according to a modification of the embodiment.

FIG. 4 shows a procedure of a process executed by the controller 100 to implement this modification.

As shown in FIG. 4, the controller 100 executes the process of S110 after executing the process of S200 shown in FIG. 3.

In the process of S200, the controller 100 acquires the second pressure P2, which is the fuel pressure detected by the second pressure sensor 82.

Next, the controller 100 determines whether or not overshoot of the second pressure P2, which is the fuel pressure, has subsided (S210). The determination as to whether or not overshoot of the second pressure P2 has subsided can be made as appropriate. For example, it can be determined that overshoot of the second pressure P2 has subsided when the second pressure P2 continues to be lower than or equal to a second determination pressure that is lower than a prescribed first determination pressure after exceeding the first determination pressure.

Then, the controller 100 repeats the process of S210 until it is determined that the overshoot of the second pressure P2 has subsided.

In the process of S210, when it is determined that the overshoot of the second pressure P2 has subsided (S210: YES), the controller 100 executes the process of S130. That is, the controller 100 executes a valve opening process of opening the second shut-off valve 22 by outputting a valve opening command to the second shut-off valve 22. Then, in a case in which the process of S130 is ended, the controller 100 ends the process.

In this modification, after the valve closing process of the second shut-off valve 22 is executed, the second shut-off valve 22 is opened after the overshoot of the fuel pressure subsides. Therefore, the second shut-off valve 22 can be opened at an appropriate timing.

The process of S100 shown in FIG. 3 may be omitted. In this case, the timing at which the process of closing the second shut-off valve 22 is started can be advanced as compared with the case in which the process of S100 is executed.

The gas fuel does not have to be hydrogen gas and may be other type of gas fuel, such as a compressed natural gas.

The controller 100 includes the CPU 110 and the memory 120 and configured to execute software processing. However, this is merely an example. For example, the controller 100 may include a dedicated hardware circuit (e.g. an application specific integrated circuit: ASIC) that executes at least part of the software processing executed in the above-described embodiment. That is, the controller 100 may be modified to have any one of the following configurations (a) to (c). (a) A configuration including a processor that executes all of the above-described processes according to programs and a program storage device such as a memory that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. Multiple software circuits each including a processor and a program storage device and multiple dedicated hardware circuits may be provided. That is, the above processes may be executed in any manner as long as the processes are executed by processing circuitry that includes at least one of a set of one or more software circuits and a set of one or more dedicated hardware circuits. The program storage device, which is a computer-readable medium, includes any type of media that is accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A fuel supply device for an internal combustion engine, the device comprising:
   a tank that stores gas fuel;
   a fuel injection valve that supplies gas fuel to a cylinder;
   a fuel passage that supplies the gas fuel in the tank to the fuel injection valve;
   a pressure reducing valve that is provided downstream of the tank in the fuel passage;
   an electromagnetic valve that is provided downstream of the pressure reducing valve in the fuel passage so as to open and close the fuel passage; and
   a processing circuitry, wherein
   a pressure reduced by the pressure reducing valve is defined as an outlet-side pressure,
   the pressure reducing valve includes a valve member that opens and closes in accordance with an increase and a decrease in the outlet-side pressure, and
   the processing circuitry is configured to execute a valve closing process of closing the electromagnetic valve when a stop condition for stopping fuel injection of the fuel injection valve is met.

2. The fuel supply device for an internal combustion engine according to claim 1, wherein the processing circuitry is configured to execute the valve closing process in a case in which the stop condition for stopping the fuel injection of the fuel injection valve is met and an injection amount of the fuel injection valve when the stop condition is met is greater than or equal to a prescribed determination value.

3. The fuel supply device for an internal combustion engine according to claim 1, wherein the processing circuitry is configured to execute a valve opening process of opening the electromagnetic valve when a valve closing time of the electromagnetic valve by execution of the valve closing process becomes greater than or equal to a prescribed determination value.

4. The fuel supply device for an internal combustion engine according to claim 1, further comprising a sensor that detects a fuel pressure in the fuel passage between the pressure reducing valve and the electromagnetic valve,
   wherein the processing circuitry is configured to execute a valve opening process of opening the electromagnetic valve when an overshoot of the fuel pressure detected by the sensor subsides after executing the valve closing process.

* * * * *